United States Patent [19]
Nayak

[11] Patent Number: 5,868,333
[45] Date of Patent: Feb. 9, 1999

[54] TAPE MEDIA CARTRIDGE SYSTEM AND COMPONENTS THEREOF AND METHODS OF MAKING AND USING THE SAME

[75] Inventor: Ashok B. Nayak, Glendora, Calif.

[73] Assignee: Seagate Technology, Inc., Scotts Valley, Calif.

[21] Appl. No.: 974,251

[22] Filed: Nov. 19, 1997

Related U.S. Application Data

[60] Provisional application No. 60/053,786 Jul. 25, 1997.

[51] Int. Cl.⁶ .................................................. G11B 15/67
[52] U.S. Cl. ...................................... 242/338; 242/348.2
[58] Field of Search ................................ 242/332, 332.1, 242/332.2, 332.4, 338, 338.2, 347.1, 348, 348.2; 360/95, 96.5

[56] References Cited

U.S. PATENT DOCUMENTS

| | | |
|---|---|---|
| 3,150,840 | 9/1964 | Briskin et al. . |
| 3,756,705 | 9/1973 | Takeichi et al. . |
| 4,045,821 | 8/1977 | Fujikura ................................... 360/132 |
| 4,555,077 | 11/1985 | Platter et al. ............................ 206/389 |
| 4,646,177 | 2/1987 | Sanford et al. ............................ 360/95 |
| 5,237,469 | 8/1993 | Kukreja et al. ............................ 360/93 |
| 5,253,821 | 10/1993 | Johnson . |
| 5,267,706 | 12/1993 | Vollmann . |
| 5,492,284 | 2/1996 | Sorenson .............................. 242/348.2 |
| 5,660,345 | 8/1997 | Buckland et al. ....................... 242/338 |

*Primary Examiner*—John P. Darling
*Attorney, Agent, or Firm*—Merchant, Gould, Smith, Edell, Welter & Schmidt

[57] ABSTRACT

An apparatus and processes for making and using the same, for holding tape media for use in compact computer tape drives. Tape media cartridges for use in compact computer tape drives have a single reel for holding the tape media, and include a leader block coupled to the tape media. When inserted into the tape drive, a leader block handling mechanism within the tape drive grips the leader block and threads the tape media on a take up reel in the tape drive. The apparatus permits the leader block handling mechanism to more easily grip the leader block, and promotes more compact designs for tape media cartridges and tape drives.

22 Claims, 9 Drawing Sheets

TAPE MEDIA CARTRIDGE SYSTEM AND COMPONENTS THEREOF AND METHODS OF MAKING AND USING THE SAME

RELATED APPLICATION

This invention relates to provisional application Ser. No. 60/053,786 filed Jul. 25, 1997. The contents of this application is incorporated by reference herein.

BACKGROUND

1. Field of the Invention

The present invention relates, generally, to apparatuses for holding and protecting mass data storage media for use in connection with computer tape drives or other mass data storage read/write devices, and to processes of making and using the same. Preferred embodiments of the present invention relate to cartridges for holding a single reel of tape media for use in compact computer tape drives, and to cartridges in which the cartridge aperture cover is attached to the cartridge housing structure and detached from the tape media leader block.

2. Related Art

Current mass data storage read/write devices, such as computer tape drives, require compatibility with portable and exchangeable mass data storage units. Often the portable mass data storage units are in the form of a relatively rigid cartridge which contains magnetic tape media. Such cartridges, generally, are of a dual tape reel or a single tape reel configuration, with the single reel construction preferred in many applications, because of the ability to construct a more compact cartridge housing fitting only a single reel.

In general, single reel cartridge housings are provided with an aperture to permit the tape media to be transferred in and out of the cartridge. Mechanisms within the tape drive device draw the tape media out of the cartridge housing, pass the tape media adjacent one or more read and/or write heads and wind the tape media about a tape reel located within the tape drive device. A mechanism is also provided to rewind the tape media back onto the single cartridge reel, such as by rotating the cartridge reel in a rewind direction. A movable aperture cover is typically provided to help prevent contamination of the cartridge interior or accidental removal of tape media when the tape media is fully wound within the cartridge housing and the cartridge is external to a computer tape drive or other mass data storage read/write device.

In typical single reel configurations, a leader block is coupled to one end of the tape media, to permit feeding of the tape media into the tape drive. When one of such single reel cartridges is inserted into a computer tape drive, a leader block handling mechanism within the tape drive grips the leader block, draws the leader block and attached tape media from the cartridge housing, and feeds the tape media onto a take up reel inside the tape drive.

Popular, conventional, single reel cartridges integrate the cartridge aperture cover with the leader block. In such cartridges, the leader block is of a size and shape to obstruct and close-off the cartridge aperture, upon the cartridge tape media being fully wound into the cartridge housing. This function results in relatively large leader blocks which can create a difficulty where limited space is available for a compact tape drive product.

SUMMARY OF THE DISCLOSURE

Accordingly, it is an object of preferred embodiments of the present invention to provide an apparatus and process of making and using the same, for holding a single reel of tape media for use in compact computer tape drives, in which the cartridge aperture cover is detached from the tape media leader block.

A preferred cartridge includes a shell having a front side provided with an aperture through which tape media may be drawn. A movable aperture door is coupled to the shell proximate to the aperture. A reel for holding the tape media and leader block is mounted inside the shell. The cartridge has an opening mechanism to open the aperture door and expose the aperture, and a closing mechanism to close the aperture door and cover the aperture.

In one preferred embodiment of the invention, the door opening mechanism includes a cable and tab arrangement, which permits the aperture door to be opened with a mechanism disposed on the side of the cartridge, rather than the front of the cartridge. This configuration allows the size of the front of the cartridge to be minimized, where compact size is highly desirable. In one preferred embodiment, the cable and tab arrangement permits opening of the aperture door from the side of the cartridge, as part of the action of inserting the cartridge into a mass data storage read/write device. This configuration also permits opening of the aperture door without the need for motors or electrical components.

In another preferred embodiment of the invention, the door closing mechanism includes a spring which is loaded during the door opening process. When the door opening mechanism is released, the spring urges the door to return to the closed position without further affirmative action by the user.

In a further preferred embodiment of the invention, the cartridge aperture encompasses a corner section of the cartridge housing. This configuration permits the tape media to exit the cartridge housing from a variety of angles, without potential damage to the tape media from contacting the cartridge housing. This preferred configuration further permits a leader block handling mechanism to access the leader block from several directions, thus maximizing cartridge compatibility with a variety of leader block handling mechanism mounting locations within mass data storage read/write devices.

In yet further preferred embodiments of the invention, the aperture door is pivotally mounted to the cartridge shell. This configuration permits the portion of the aperture door that covers the aperture to be completely removed from the proximity of the aperture when the door is opened.

DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which are shown, by way of illustration, several embodiments of the present invention. It is understood that other embodiments may be utilized and structural changes may be made without departing from the scope of the present invention.

The present invention relates generally to cartridges for holding mass data storage media for use in connection with computers or other mass data storage read/write devices. In preferred embodiments, it relates to cartridges for holding a single reel of tape media for use in compact computer tape drives. In particular, preferred embodiments relate to small form factor tape media cartridges having an aperture door which is attached to the cartridge housing and detached from the tape media leader block. Further embodiments relate to actuation of a cartridge aperture door remote from the side of the cartridge housing. Still further preferred embodiments relate to systems for loading and using the cartridges in mass data storage read/write devices.

As described in more detail below, a preferred cartridge includes a housing shell having an aperture on the front of the housing shell. A reel is mounted inside the housing shell. A movable aperture door is pivotally mounted on the cartridge housing shell, proximate to the aperture. A tab for remotely articulating the aperture door is located on one side of the shell housing. A cable, which connects the pivotal door to the tab, is routed along an arcuate cable guide inside the housing shell. The arcuate cable guide spaces the cable from the reel and directs the cable toward the tab. When the tab is engaged and translated toward the rear of the shell, the door is caused to pivot about its pivot axis, which opens the aperture and exposes the interior of the housing shell. When the tab is released, a torsion spring urges the aperture door to a closed position, covering the aperture.

Figure 1:
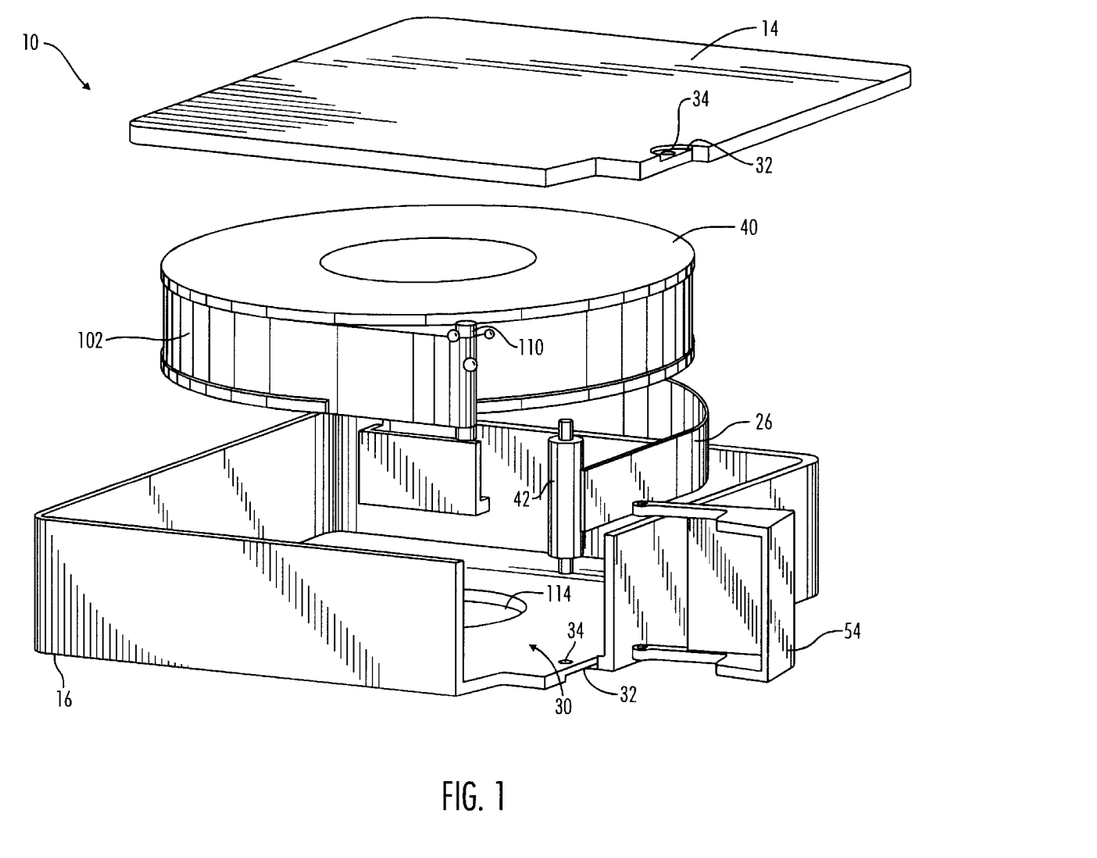
FIG. 1 is an exploded view of a cartridge according to one embodiment of the present invention.
Figure 2:
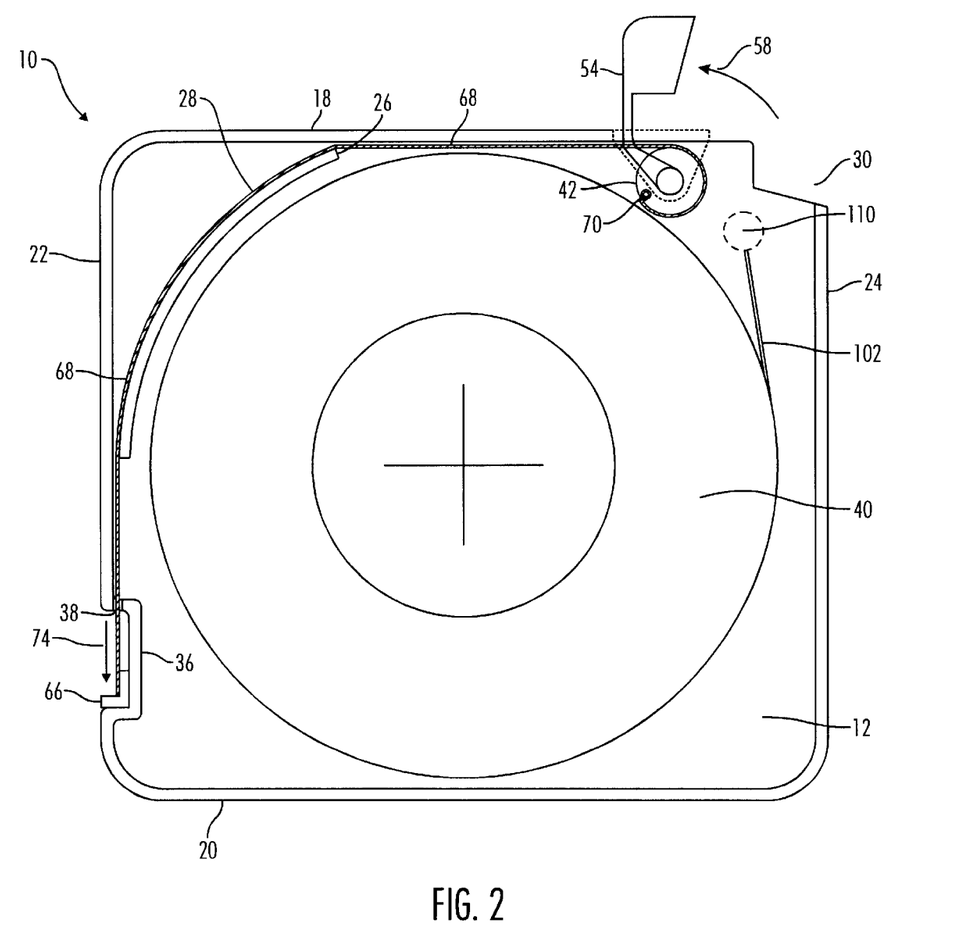
FIG. 2 is a top plan view of a mass data storage cartridge according to a preferred embodiment of the present invention.

FIG. 1 is an exploded side of one embodiment of the cartridge 10. As shown in FIG. 1, the cartridge 10 includes a housing shell top portion 14 and a housing shell bottom portion 16 which, when joined, define a housing shell 12 having an open interior. FIG. 2 is a top view of the cartridge 10, as viewed through the housing shell top portion 14. As shown in FIGS. 1 and 2, a reel 40, for holding mass data storage media 102, is disposed within the interior of the housing shell. The exposed end of the tape media is provided with a leader block 110. The reel 40 is interposed between, and is rotatable within, the housing shell top 14 and bottom 16 portions.

The shell 12 has an aperture 30 defined by one or both housing shell portions 14 and 16. Upon joining the top and bottom housing portions, the aperture 30 opens to the housing interior.

A movable aperture door 54 is mounted to the housing shell 12 for selectively exposing and covering the aperture 30. In one preferred embodiment, the aperture door 54 is pivotally mounted to the shell 12 with a pivot member, such as a rotatable, generally cylindrical pivot pin 42 received within apertures 34 in the housing shell portions 14 and 16. In the illustrated embodiment, the ends of the pivot pin 42 protrude through the housing shell 12, and fixably engage the aperture door 54. The pivot pin 42 is mounted for rotation relative to the housing shell 12, about the axis cylindrical axis of the pin. In other embodiments, other pivot connecting means may be used to pivotally couple the aperture door 54 to the housing shell 12. For example, the pivot pin 42 may be formed integral with the aperture door 54 or may be replaced by protrusions on the aperture door 54 (or housing shell 12) which pivotally engage notches or indentations on the housing shell 12 (or aperture door 54). In still further embodiments, the aperture door 54 may be slidably coupled to the shell 12 by suitable sliding means.

In preferred embodiments, at least the shell top 14 and bottom 16 portions are formed from a rigid material, preferably a plastic material, for example, a polycarbon material, which lends itself to standard molding techniques. The aperture door 54 may be made of similar material.

With reference to FIG. 2, the illustrated housing shell 12 has a front side 18, a rear side 20 opposite to the front 18, a first (or left) side 22, and a second (or right) side 24 opposite to the first side 22, which define an open interior containing the reel 40. In one preferred embodiment, the aperture 30 encompasses one corner of the shell front 18, defined by the intersection of the housing shell front side 18 and the housing shell second side (or right side) 24. A corner location of the aperture 30 maximizes the directions from which a leader block gripping mechanism may access the housing shell interior to grip and retrieve the leader block 110 (depicted as a dashed circle) residing within the shell 12, when the aperture door 54 is opened and the cartridge 10 is loaded into a mass data storage read/write device, such as a computer tape drive. In preferred embodiments, the cartridge 10 is thus adapted to be utilized in a variety of mass data storage read/write devices whose leader block handling mechanisms may be mounted in different locations within the mass data storage read/write devices. The corner location of the aperture 30, thus, accommodates a variety of potential leader block handling mechanism locations. Further, the corner configuration aperture 30 permits the mass data storage media 102, such as tape media, to emerge from the cartridge 10 in a variety of exit angles, while minimizing the risk of contacting the housing shell 12 with the tape media.

In preferred embodiments, the cartridge 10 includes an opening mechanism to permit opening of the aperture door 54 from a location remote from the shell front 18. Remote opening of the aperture door 54 is preferred in order to allow the physical dimensions of the cartridge 10 to be minimized, especially near the shell front 18. In one preferred embodiment, the remote opening mechanism includes a sliding tab 66 and a cable 68 which couples the tab 66 and door 54.

In the illustrated embodiment, the cable 68 is coupled to and extended between the pivot pin 42 and the sliding tab 66. The cable 68 is routed along a cable guide member 26. In the illustrated embodiment, the cable guide member defines an arcuate guide, curving around a portion of the tape media reel 40, in close proximity to the reel and following the curvature of the reel for purposes of space efficiency. The cable 68 is guided along a convex side 28 of the arcuate cable guide 26. The cable guide 26 is disposed within the housing shell 12 between the shell front 18 and the shell first side 22. The arcuate cable guide 26 spaces the cable 68 from the reel 40 and directs the cable 68 toward the tab 66. In alternate embodiments, these functions of the arcuate cable guide 26 may be accomplished by a pulley, pin structure, or the like. However, an arcuate cable guide is preferred, for purposes of simplicity of manufacture and minimization of moving parts.

In preferred embodiments, the sliding tab 66 is located adjacent a side of the shell 12, such as on the shell first side 22 (left side in FIG. 2). In one preferred embodiment, the tab 66 is slidably coupled to the shell 12. Preferably, the tab 66 is located in an indentation or notch 36 formed in the housing shell side, to minimize the overall physical dimensions of the cartridge 10. The tab 66 is preferably maintained within the notch 36 and slidable in the directions toward and away from the front side of the cartridge housing (the vertical direction in FIG. 2) by suitable retaining means, for example, rails or guides formed in the area of the notch 36, in a well known manner.

In preferred embodiments, the notch 36 has a slot 38 to permit the passage of the cable 68 through the housing shell 12 for connection with the slidable tab 66 outside of the housing shell. Translation of the slidable tab 66 in the direction toward the housing shell rear 20, as designated by arrow 74, draws the cable 68 from the circumference of the rotatable pivot pin 42. This movement causes rotation of the pivot pin 42 and moves the aperture door 54 to an open position in the direction of arrow 58. as shown in FIG. 2.

Figure 3:
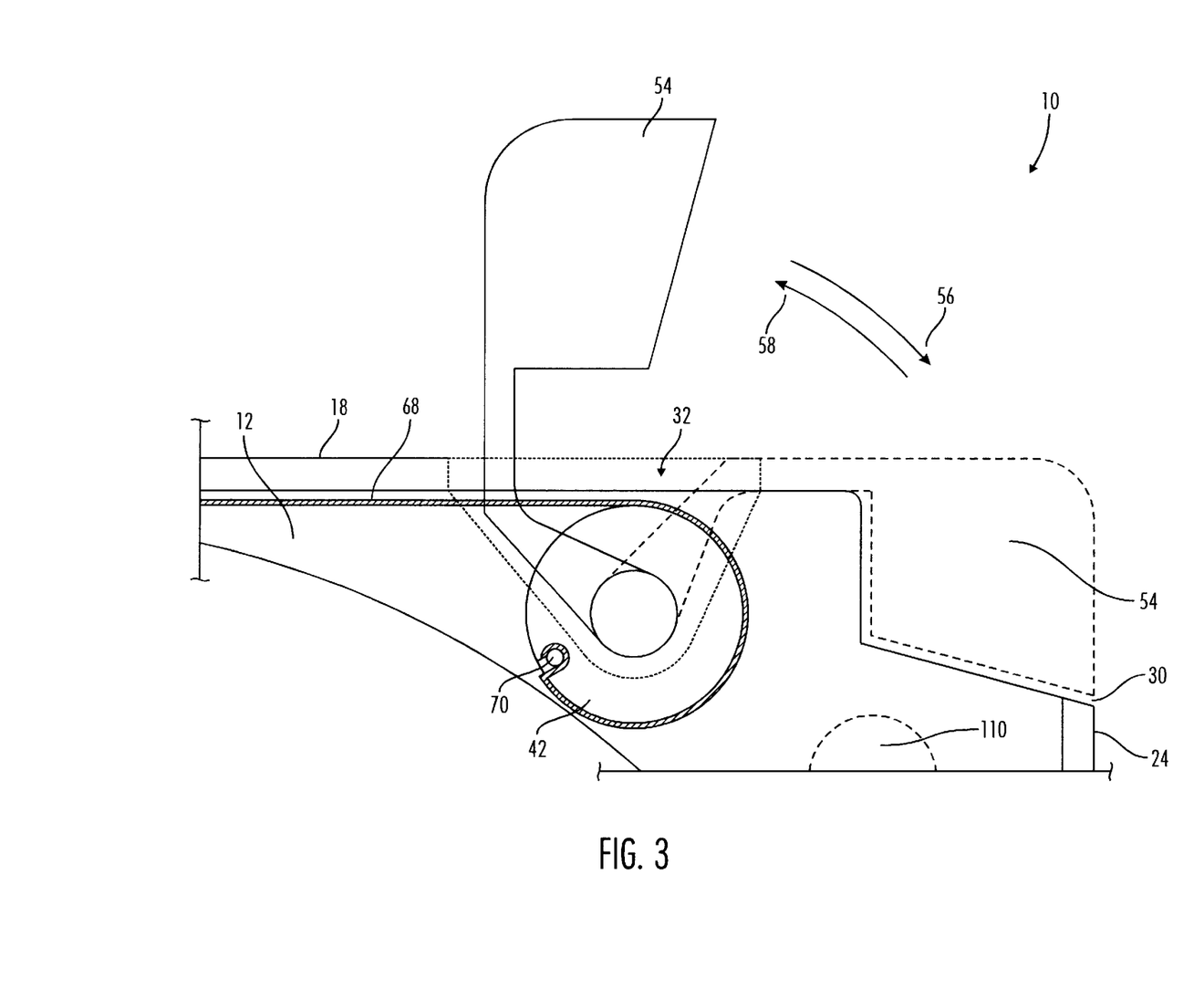
FIG. 3 is an enlarged top plan view of the portion of the mass data storage cartridge of FIG. 2 containing the aperture door and aperture.

FIG. 3 shows an enlarged plan view of the portion of the cartridge 10 having the aperture 30 and aperture door 54. In one preferred embodiment as shown in FIG. 3, the cartridge 10 includes an aperture door 54 rotatably movable between a closed position, as designated by arrow 56 (and as shown in broken lines), and the open position, as designated by arrow 58 (and as shown in solid lines). In preferred embodiments, the open position (solid line position) of the door 54 is pivoted approximately 90 degrees from the closed position of the door. In the closed position (broken line position in FIG. 3), the aperture door 54 substantially completely covers the aperture 30. In the aperture door open position (solid line position in FIG. 3), the aperture door 54 substantially completely exposes the aperture 30. In the illustrated embodiment, the aperture door 54 is fixed to the pivot pin 42 such that rotation of the pivot pin 42 causes pivotal motion of the door 54 between open and closed positions.

As described above, the cable 68 has one end coupled to the rotatable pivot pin 42 and an opposite end coupled to the sliding tab 66, such that a sliding motion of the tab 66 in the direction of arrow 74 causes a rotation of the pivot pin 42 in the door opening direction. More specifically, in the illustrated embodiment, the cable 68 is coupled to a portion of the pivot pin 42 laterally offset relative to the axis of rotation of the pivot pin. In preferred embodiments, the cable 68 comprises a flat, plastic ribbon which is sufficiently flexible to wrap around a portion of the circumference of the pivot pin 42 and yet have sufficient tensile strength to repeatably open the aperture door 54 without substantial degradation of its material properties. In one preferred embodiment, the cable 68 comprises a mylar ribbon.

The cable 68 is coupled to the pivot pin 42, preferably by a dowel 70 which frictionally engages an end of the cable 68 with the pivot pin 42. This preferred construction avoids the use of adhesives and provides a reliable joint between the pivot pin 42 and the cable 68. However, in other embodiments, other suitable means to couple the cable 68 to the pivot pin 42, such as bonding, mechanical fastening, or the like, may be utilized.

In preferred embodiments, recesses 32 are formed in the housing shell top 14 and bottom 16 portions. The recesses 32 permit the portion of the aperture door 54 coupled to the pivot pin 42 to move between the closed and open positions, while remaining within the physical dimensions defined by the housing shell 12.

Figure 4:
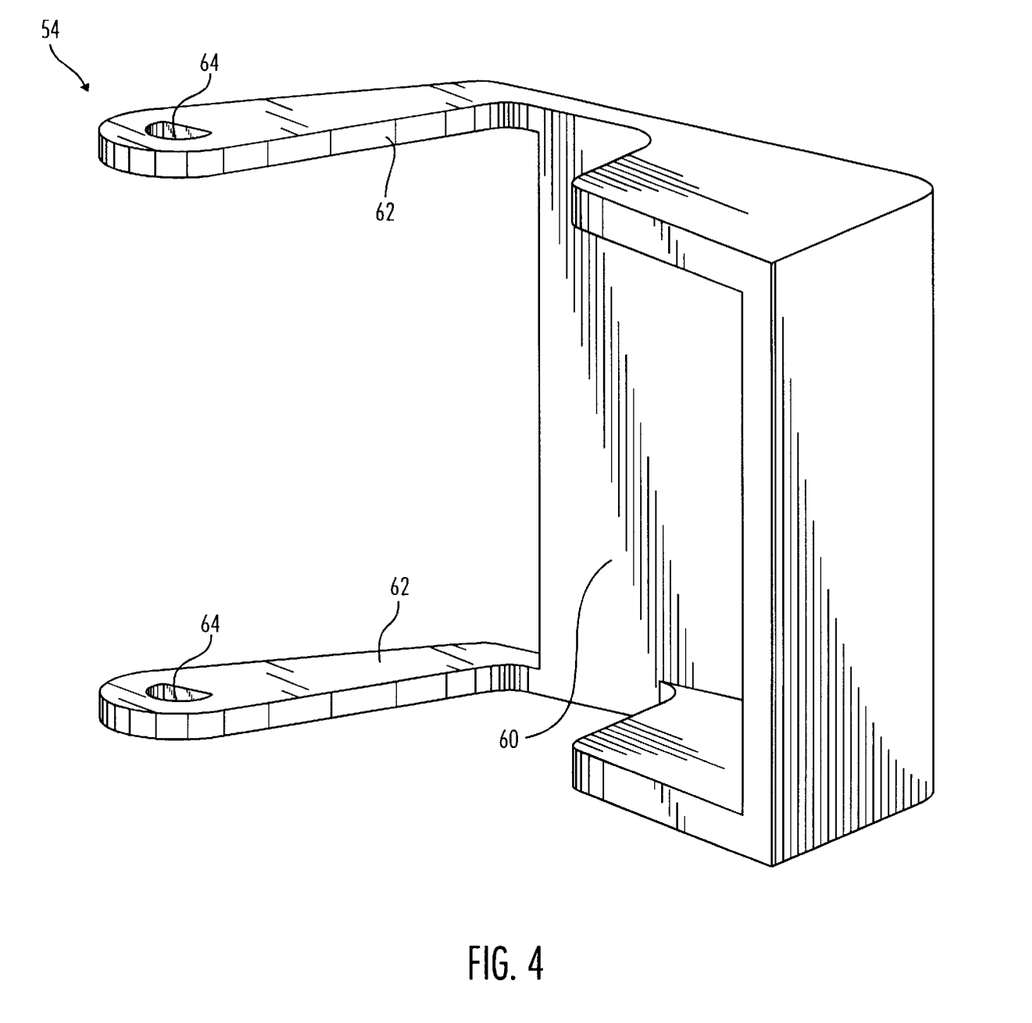
FIG. 4 is an enlarged perspective view of a preferred embodiment of an aperture door for the mass data storage cartridge as shown in FIG. 2.

FIG. 4 is a perspective view of one preferred embodiment of an aperture door 54. In FIG. 4, the aperture door 54 has an aperture cover portion 60 and a clevis 62 portion. The aperture cover portion 60 is configured so as to substantially completely cover the aperture 30 when the aperture door 54 is in the closed position 56. In one preferred embodiment, the aperture cover portion 60 is configured to cover an aperture 30 which defines substantially an entire corner section of the housing shell 12. As described above, this aperture 30 configuration permits a wide range of exit angles for the mass data storage media 102. It also accommodates a variety of leader block 110 handling mechanisms (shown in broken lines in FIGS. 2 and 3) located within mass data storage read/write devices 100 (described below).

In preferred embodiments, the clevis portion 62 of the aperture door 54 defines two arms 62a and 62b spaced apart by a distance sufficient to straddle the housing shell 12 at the recesses 32. This arrangement permits the aperture door 54 to move between the closed and open positions, while maintaining a substantial portion of the clevis arms 62a and 62b within the physical envelope defined by the housing shell 12. In one preferred embodiment, the clevis portion 62 is sufficiently resilient to deform and snap over the end portions 50 of the pivot pin 42 protruding into the recesses 32, thereby coupling the pivot pin 42 to the aperture door 54, and the aperture door 54 to the housing shell 12.

In preferred embodiments, the clevis portion 62 is structured such that relative movement is precluded between the aperture door 54 and the pivot pin 42, once engaged together. Means employed to prevent such relative movement include, but are not limited to, bonding, mechanical fastening, and the like. In preferred embodiments, the clevis portion 62 terminates in eyelets 64 having keyways. In one preferred embodiment, the eyelets define a shape other than a circular shape, such as a semi-circular or D-shaped eyelet as shown in the drawings. Upon engagement with similarly shaped protrusions on the ends of the pivot pin 42, relative motion between the pivot pin 42 and clevis is inhibited.

Figure 5:
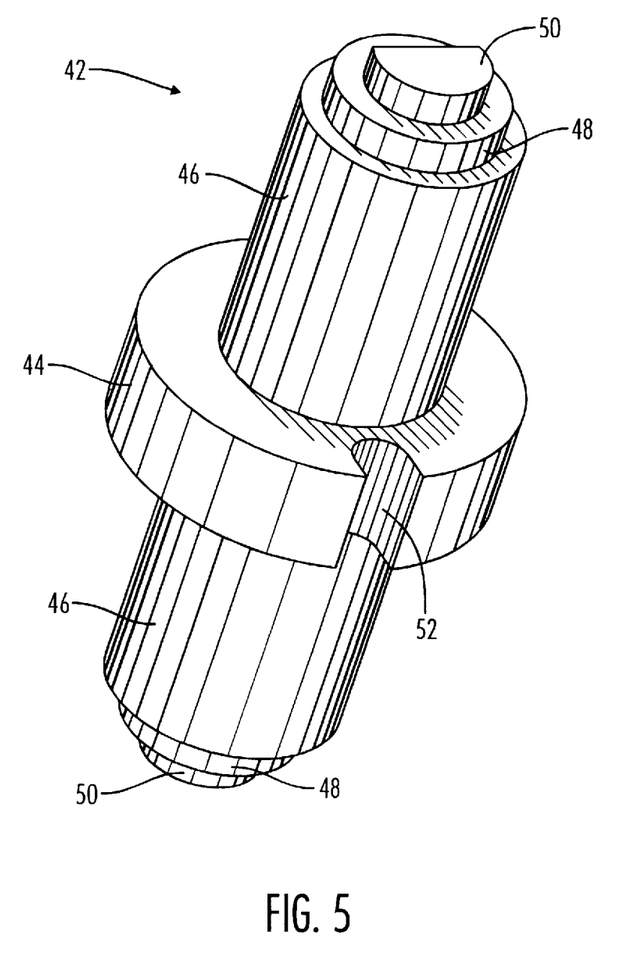
FIG. 5 is an enlarged perspective view of a preferred embodiment of a pivot pin for the mass data storage cartridge as shown in FIG. 2.

FIG. 5 shows the details of one preferred embodiment of the pivot pin 42. In FIG. 5, the pivot pin 42 has generally cylindrical shape, with a cam portion 44 at about its midpoint to accept the cable 68. The diameter of the cam portion 44 is selected such that, when the tab 66 is translated along the length of the notch 36, toward the housing shell rear 20, the cable 68 is drawn from its initial position around the circumference of the cam portion 44, to rotate the pivot pin 42 a suitable degree to move the aperture door 54 approximately 90 degrees from the closed position to the open position. In one preferred embodiment, the cam 44 portion has a passage 52 to receive a dowel 70 as a means of fixing the cable 68 to the pivot pin 42. As described above, other means may be employed to fix the cable 68 to the pivot pin 42, including, but not limited to, bonding, mechanical fastening, and the like.

In preferred embodiments, the pivot pin 42 includes a sleeve portion 46 disposed on each side of the cam portion 44, and axle portions 48 extending from the distal ends of the sleeve portions 46. The axle portions 48 are configured to rotatably engage the bores 34 in the housing shell top 14 and bottom 16 portions when the top 14 and bottom 16 portions are joined to form the housing shell 12. A shaped end portion 50 extends from the distal end of each axle portion 48. When the pivot pin 42 is coupled to the housing shell 12, as shown in FIG. 2, the end portions 50 protrude from the recesses 32 of the housing shell top 14 and bottom 16 portions, to engage with the clevis eyelets 64 of the aperture door 54.

As noted above, the cross-sections of the end 50 portions are preferably configured to preclude relative rotation between the pivot pin 42 and the aperture door 54, once engaged together. Fixing of the pivot pin 42 to the aperture door 54 may be accomplished by any suitable means, such as mechanical fastening, bonding, or the like. As described above, in preferred embodiments, the cross-sections of the end portions 50 are keyed to engage the keyways formed in the eyelets 64 of the clevis portion 62.

Figure 6:
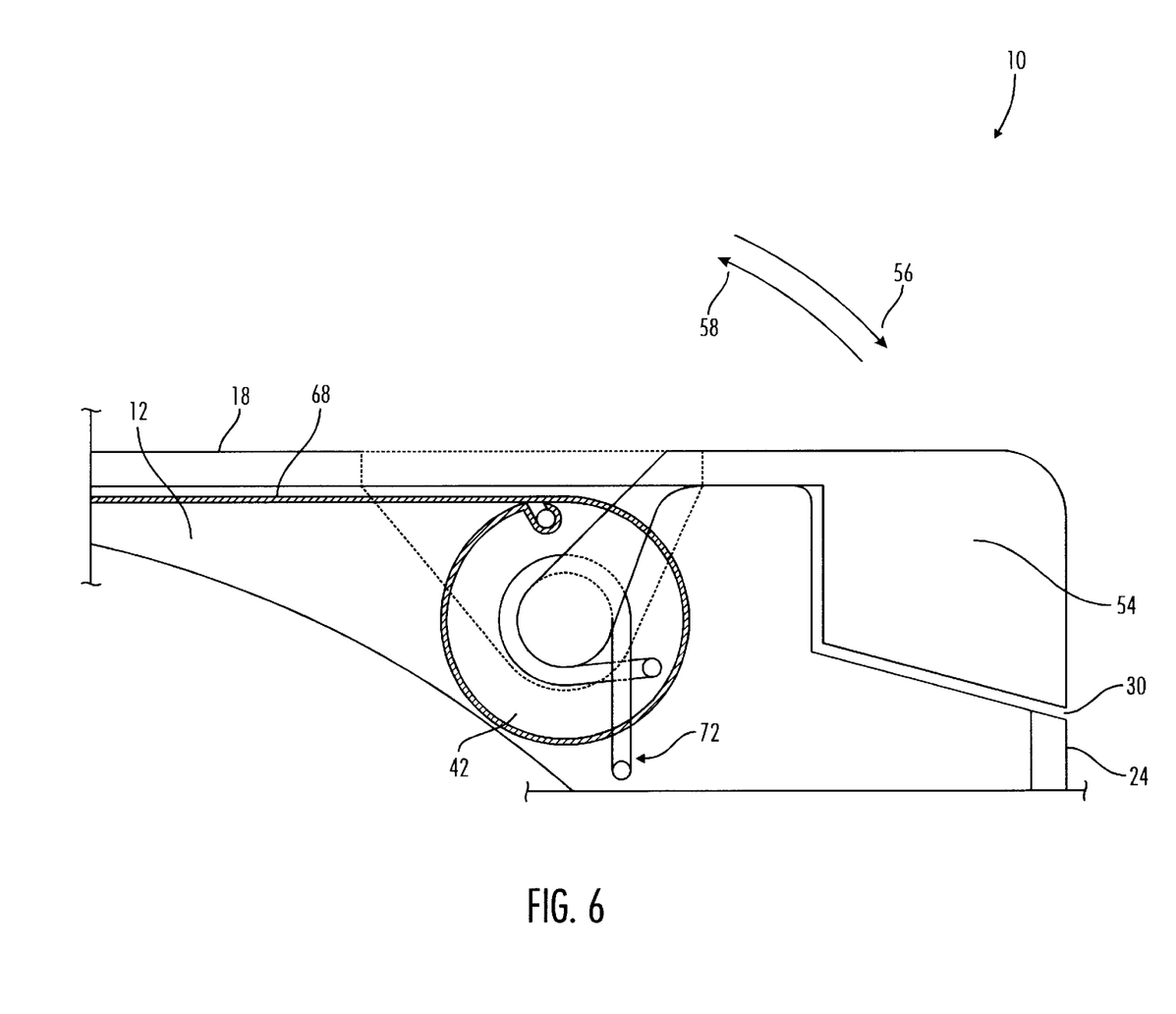
FIG. 6 is an enlarged plan view of the portion of the mass data storage cartridge of FIG. 3 containing the aperture door and aperture, with the aperture door closed over the aperture.

FIG. 6 is an enlarged top view of the portion of the cartridge 10 containing an aperture door closing mechanism according to a preferred embodiment. In FIG. 6, the spring member 72 is arranged for urging the aperture door 54 to the closed position 56. In one preferred embodiment, the spring is a torsion spring 72, having one end coupled in fixed relation relative to the pivot pin 42 and the other end coupled in fixed relation relative to the housing shell 12. The torsion spring 72 is preferably coupled to the pivot pin 42 cam portion 44, near the outer peripheral edge of the cam portion 44, to maximize its rotational leverage on the pivot pin 42. The torsion spring 72 is preloaded to urge the aperture door 54 in the closed direction 56, for example, by being wound substantially around the circumference of the pivot pin 42 with the aperture door 54 in the closed position 56. When the aperture door 54 is moved towards the open direction, as designated by arrow 58, the torsion spring 72 is further wound around the pivot pin 42, thereby further loading the torsion spring 72. When the aperture door 54 is released from the open position 58, the torsion spring 72 partially unloads and returns the aperture door 54 to the closed position shown in FIG. 6.

Figure 7:
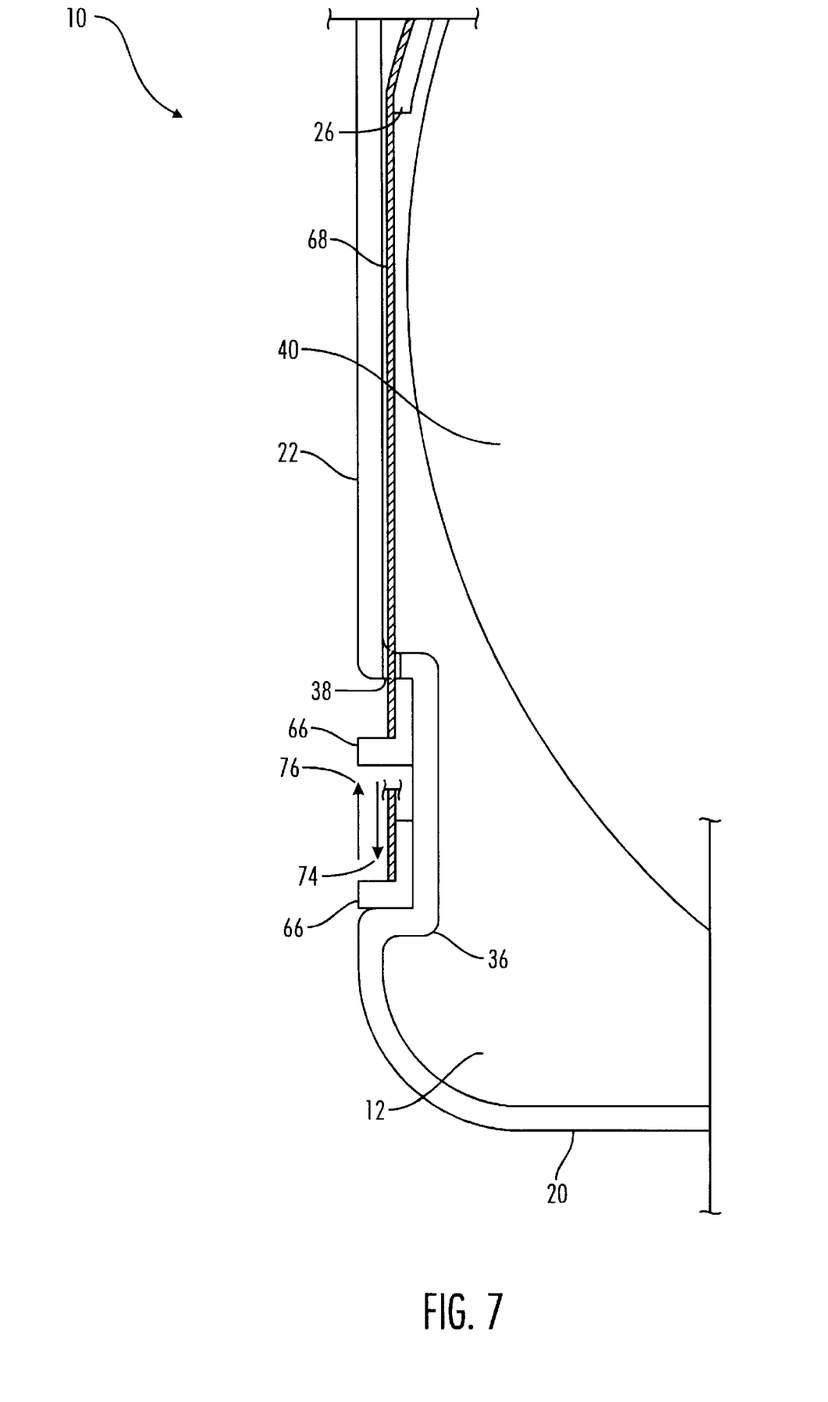
FIG. 7 is an enlarged top plan view of the portion of the mass data storage cartridge of FIG. 2, having the tab for the aperture door opening mechanism.

FIG. 7 shows an enlarged top view of the portion of the cartridge 10 containing the tab 66. In preferred embodiments, the aperture door 54 is articulated remotely from the shell front 18. As described above, this preferred configuration allows the physical dimension of the cartridge 10 to be minimized, at least along the housing shell front 18, thereby permitting a more compact cartridge size. As described above, in one preferred embodiment, a tab 66 is slidably coupled to the housing shell 12 and disposed within the notch 36 along the housing shell first side 22. Also as described above, the tab 66 is coupled to the cable 68, which, in turn, is coupled to the pivot pin 42.

Engaging the tab 66 and translating the tab 66 toward the shell rear 20, as designated by arrow 74, draws the cable 68, rotates the pivot pin 42 and overpowers the closing force of the spring 72 to move the aperture door 54 in the direction of arrow 58 (FIG. 6), from the closed position to the open position. In preferred embodiments, this movement also further loads the torsion spring 72 as shown in FIG. 6. When the tab 66 is disengaged, the torsion spring 72 unloads and rotates the pivot pin 42 to move the aperture door 54 to the closed position shown in FIG. 6. This motion draws the cable 68 and the tab 66 toward the slot 38 as designated by arrow 76.

Figure 8:
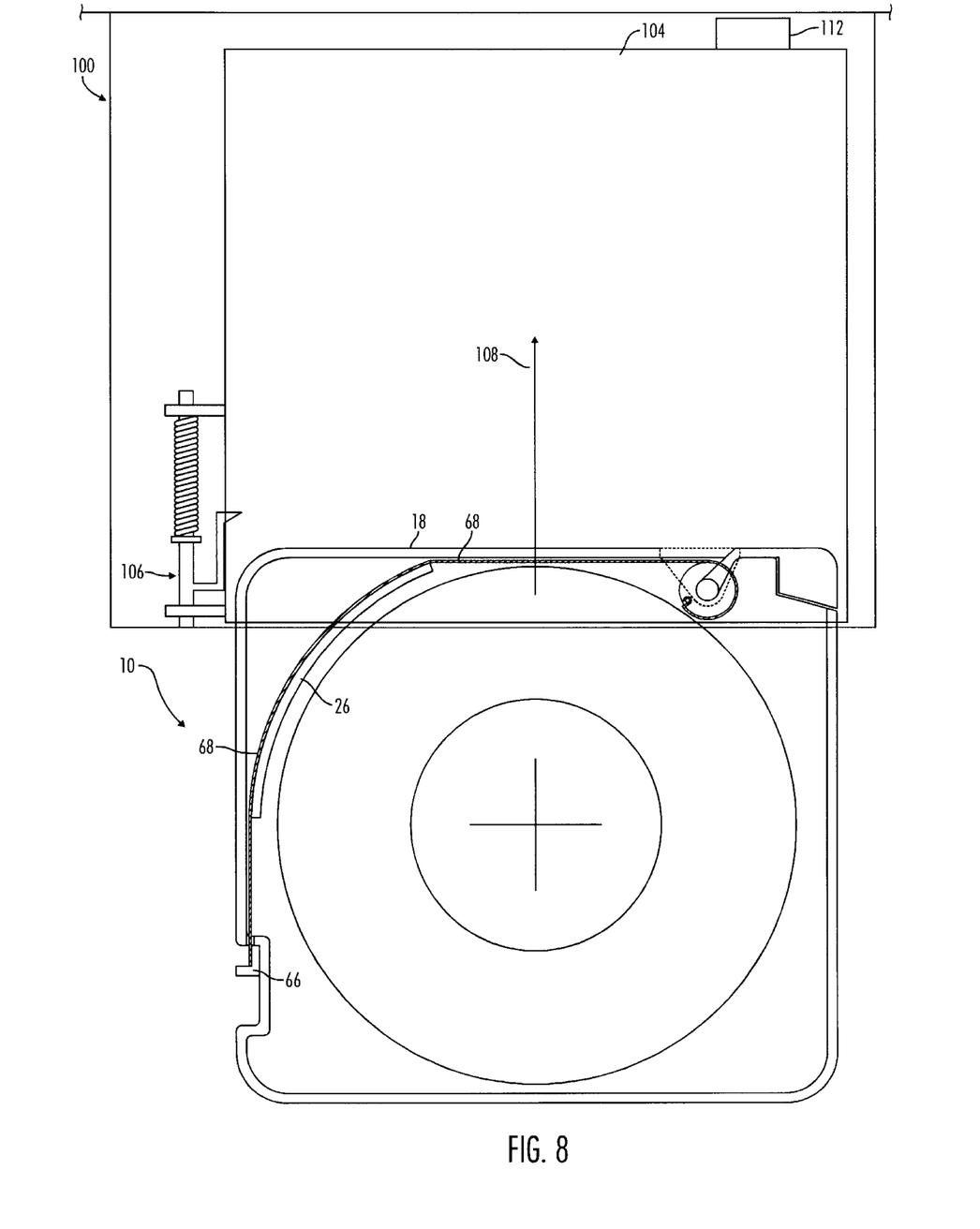
FIG. 8 is a schematic drawing of the mass data storage cartridge of FIG. 2, in conjunction with elements of a mass data storage read/write device.

FIG. 8 is a schematic drawing of one preferred embodiment of the cartridge 10, being loaded into a data storage read/write device 100, which may be, for example, a tape drive unit. The device 100 comprises a tape reading and/or recording electronics (not shown), as are well known in the art. The read/write device 100 includes a cartridge receiving tray 104 within a cartridge receiving bay, an associated aperture door actuation mechanism 106, and a leader block handling mechanism 112. As shown in FIG. 8, most of the cartridge 10 in this view is external to the mass data storage read/write device 100, and the aperture door 54 is in the closed position 56. In preferred embodiments, the tray 104 is disposed inside of the tape drive device 100 and is adapted to receive and hold the cartridge 10, upon insertion of the cartridge in the direction of arrow 108, through an opening in the front of the tape drive device 100.

In preferred embodiments, the aperture door actuation mechanism 106 is a spring loaded finger mounted to the tray. In one preferred embodiment, upon receipt of a substantial portion of the cartridge 10 in the computer tape drive tray 104, the aperture door actuation mechanism (or finger) 106 is positioned to engage the tab 66 in notch 36, as shown in FIG. 9.

Figure 9:
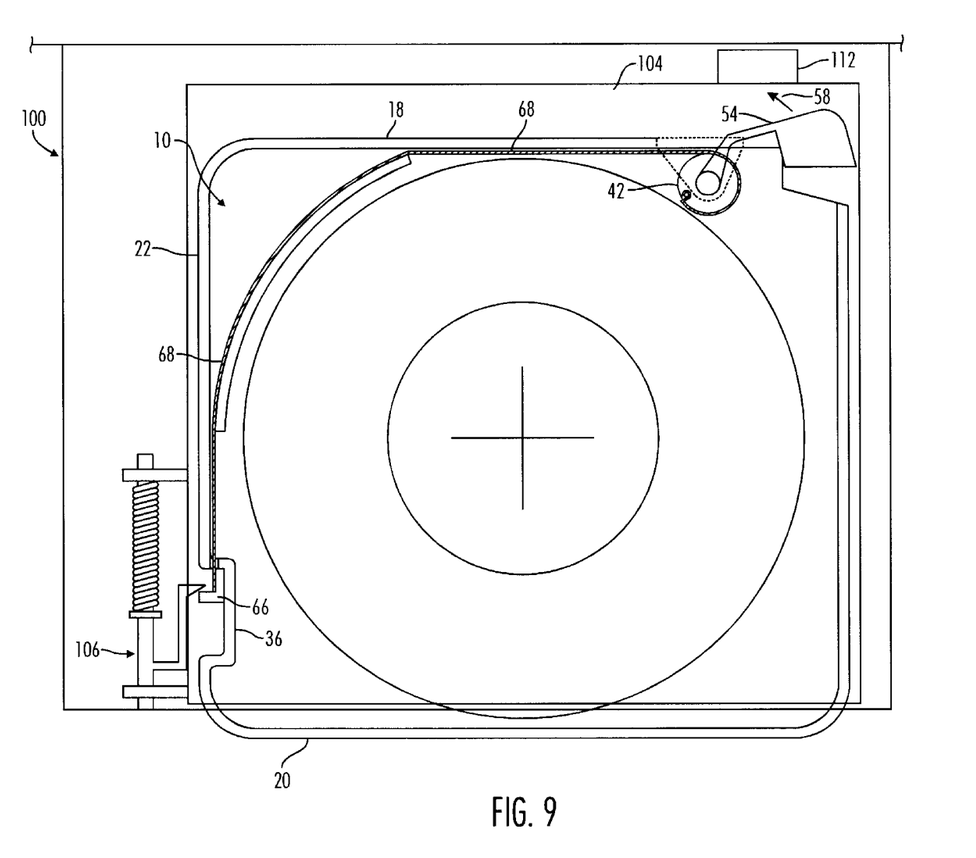
FIG. 9 is a schematic drawing of the mass data storage cartridge of FIG. 2, partially inserted into a mass data storage read/write device.

FIG. 9 shows the cartridge 10, loading mechanism (or tray) 104 and actuation mechanism (or finger) 106 of FIG. 8, however, with the cartridge and tray being inserted further into the mass data storage read/write device 100. As shown in FIG. 9, the cartridge 10 in this view is at least partially inserted into a cartridge receiving bay of the mass data storage read/write device 100, such that the aperture door 54 is caused to move toward the open position, in the direction of arrow 58. Upon at least partial translation of the loading mechanism 104 into the computer tape drive 100 as designated by arrow 108, the aperture door actuation mechanism 106, engages with the tab 66, and moves the tab 66 toward the housing shell rear 20. This movement draws the cable 68, rotates the pivot pin 42, and articulates the aperture door 54 toward the open position as described above. The door actuation mechanism 106 is preferably positioned with respect to the tray 104, such that, upon the cartridge housing 10 being fully received within the tray, the mechanism 106 effectively translates the tab 66 a sufficient distance toward the housing shell rear 20 to pivot the aperture door 54 into its fully opened state.

In preferred embodiments, the aperture door 54 is articulated to the open position 58 without the use of motorized or electrical mechanisms. Also in further preferred embodiments, the aperture door 54 is articulated to its fully opened state, prior to the cartridge being fully received within the tray 104, such that an additional volume of space need not be reserved within the read/write device 100 for the cartridge aperture door 54 to sweep from its closed position to its open position.

Accordingly, a cartridge 10 as shown in FIGS. 1–9 contains mass data storage media 102, such as tape media, for use in conjunction with a mass data storage read/write device 100, such as a computer tape drive. The cartridge 10 has a movable aperture door 54 for protecting the mass data storage media 102 from contamination. The aperture door 54 is detached from the mass data storage media 102 leader block 110. When the aperture door 54 is opened, the aperture 30 permits access to the mass data storage media 102, once the cartridge 10 is loaded into a mass data storage read/write device 100. The configuration of the cartridge 10 further permits opening of the aperture door 54 as part of the action of inserting the cartridge 10 into the read/write device 100, without the need for additional motors or electrical devices to open the door.

A mass data storage cartridge 10 such as a tape media cartridge is preferably used in a mass data storage read/write device 100 such as a computer tape drive. The cartridge 10 is received on a tray 104 within the read/write device 100. The cartridge aperture door opening mechanism engagement means, preferably a tab 66, engages an aperture door actuation mechanism 106, such as a spring loaded finger. To insert the cartridge 10 into the cartridge bay of the read/write device 100, the cartridge 10 is inserted in an opening to the cartridge bay of the read/write device, in the direction designated by arrow 108. As part of that motion, the aperture door actuation mechanism 106 engages and causes relative movement of the tab 66 toward the shell rear 20, as designated by arrow 74. This movement actuates the aperture door opening mechanism so as to articulate the aperture door 54 from the closed position to the open position, in the direction of arrow 58. The movement also preloads the spring member 72, such as a torsion spring.

Once the cartridge 10 is fully received within the tray 104 and the aperture door 54 of the cartridge is fully opened, the leader block handling mechanism 112 may be operated to obtain the leader block 110 and draw all or a portion of the data storage media 102 (such as a magnetic recording tape) from the cartridge housing and feed the media to reading and/or recording electronics. The portion of the media 102 drawn out of the cartridge housing may be returned to the cartridge housing, for example, by rotating the reel 40 with a suitable rotary drive through an aperture 114 in the bottom surface of the cartridge housing.

Upon removal of the cartridge 10 from the mass data storage read/write device 100, the aperture door actuation mechanism 106 releases pressure on the aperture door opening mechanism engagement means 66, permitting the spring member 72 to urge the engagement means 66 (through the cable 68) toward the shell front 18. As a result, the shell door 54 is moved to the closed position.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A cartridge for holding mass data storage media for use with a mass data storage read/write device, the mass data storage media having a leader block, the mass data storage read/write device having a leader block handling mechanism, the cartridge comprising:

a housing shell for containing a mass data storage media, said housing shell having an aperture for permitting passage of the mass data storage media through the housing shell;

an aperture door for selectively covering the aperture; and door operating means for selectively moving the aperture door between a closed position covering the aperture and an open position exposing the aperture.

2. A cartridge for holding a reel of mass data storage media for use with a mass data storage read/write device having a leader block handling mechanism, the cartridge comprising:

a housing shell having an interior configured for containing said reel and having an aperture of sufficient size to permit the leader block handling mechanism to grip the leader block of mass data storage media contained within the housing shell and to allow passage of the mass data storage media and the leader block through the aperture;

an aperture door for selectively covering the aperture, the aperture door being movably coupled to the housing shell for movement between a closed position covering the aperture and an open position exposing the aperture, said aperture door being detached from the leader block;

a moveable tab; and a cable, wherein the cable couples the tab to the door.

3. A cartridge as claimed in claim 2, the cartridge further including a closing mechanism for moving the aperture door from the open position to the closed position.

4. A cartridge as claimed in claim 4, wherein the closing mechanism comprises a spring member.

5. A cartridge as claimed in claim 2, the cartridge further including a pivot member for pivotally coupling the aperture door to the shell.

6. A cartridge as claimed in claim 5, wherein the housing shell further has openings for pivotally receiving the pivot member.

7. A cartridge for holding a reel of mass data storage media for use with a mass data storage read/write device having a leader block handling mechanism, the cartridge comprising:

a housing shell having an interior configured for containing said reel and having an aperture of sufficient size to permit the leader block handling mechanism to grip the leader block of mass data storage media contained within the housing shell and to allow passage of the mass data storage media and the leader block through the aperture;

an aperture door for selectively covering the aperture, the aperture door being movably coupled to the housing shell for movement between a closed position covering the aperture and an open position exposing the aperture, said aperture door being detached from the leader block; and a pivot member for pivotally coupling the aperture door to the shell wherein the housing shell further has openings for pivotally receiving the pivot member; and wherein the housing shell further has recesses surrounding the openings, for receiving a portion of the aperture door, the recesses being configured so as to permit the aperture door to move between the open position and the closed position while the portion of the aperture door is received in the recesses.

8. A cartridge for holding a reel of mass data storage media for use with a mass data storage read/write device having a leader block handling mechanism, the cartridge comprising:

a housing shell having an interior configured for containing said reel and having an aperture of sufficient size to permit the leader block handling mechanism to grip the leader block of mass data storage media contained within the housing shell and to allow passage of the mass data storage media and the leader block through the aperture;

an aperture door for selectively covering the aperture, the aperture door being movably coupled to the housing shell for movement between a closed position covering the aperture and an open position exposing the aperture, said aperture door being detached from the leader block; and an opening mechanism for moving the aperture door from the closed position to the open position.

9. A cartridge as claimed in claim 3, wherein the opening mechanism comprises:

a pivot member for movably coupling the aperture door to the housing shell, the pivot member being fixably coupled with the aperture door and rotatably coupled with the housing shell; and a cable coupled to the pivot member, the cable being at least partially wrapped around the circumference of the pivot member, such that drawing the cable from the circumference of the pivot member causes the pivot member to rotate and move the aperture door from the closed position to the open position.

10. A cartridge as claimed in claim 9, wherein the opening mechanism further includes a cable guide member having a cable guide surface spaced from the reel, the cable guide surface engaging the cable and spacing the cable from the reel.

11. A cartridge as claimed in claim 10, wherein the cable guide member is integral with the housing shell.

12. A cartridge as claimed in claim 10, wherein the cable guide surface has an arcuate shape disposed about a section of the reel.

13. A cartridge as claimed in claim 9, wherein the pivot member and aperture door are provided with complimentary keys and keyways to fixably engage the pivot member and the aperture door, and preclude relative rotation between the pivot member and the aperture door.

14. A cartridge as claimed in claim 13, wherein the complimentary keys and keyways are D-shaped.

15. A cartridge as claimed in claim 9, wherein the opening mechanism further includes a tab coupled to the end of the cable remote from the pivot member and selectively moveable to draw the cable from the circumference of the pivot member.

16. A cartridge as claimed in claim 15, wherein the tab is slidably coupled to the shell.

17. A cartridge as claimed in claim 9, wherein the cable is a mylar ribbon.

18. A cartridge as claimed in claim 3, wherein the opening mechanism comprises a cable coupled to the aperture door, for moving the aperture door from the closed position to the open position.

19. A cartridge as claimed in claim 3, wherein the opening mechanism comprises a moveable tab and a cable, wherein the cable couples the tab to the door, and wherein the opening mechanism engages with the tab and urges the tab in a direction to draw the cable and to move the aperture door from the closed position to the open position.

20. A mass data storage system for use with a mass data storage read/write device, the mass data storage read/write device having a leader block handling mechanism and a recording tape cartridge receptacle, the system comprising:

recording tape media wound around a reel, said tape media for storing data;

a leader block coupled to one end of the tape media, the leader block being configured to be gripped by the leader block handling mechanism upon receipt of the tape media and the leader block in the cartridge receptacle of the mass data storage read/write device;

a cartridge housing shell having an interior containing the tape media and leader block and being configured to be received, with the tape media and leader block contained therein, in the cartridge receptacle of the mass date storage read/write device, said housing shell further having an aperture of sufficient size for permitting the leader block handling mechanism to grip the leader block within the housing shell, upon receipt of the cartridge housing with the tape media and the leader block in the cartridge receptacle, the aperture also for permitting passage of the tape media and the leader block through the housing shell;

an aperture door for selectively covering the aperture, the aperture door being movably coupled to the housing shell, the aperture door having a closed position covering the aperture and an open position exposing the aperture, wherein the aperture door is detached from the leader block, wherein the cartridge receptacle comprises a tray, the tray having an aperture door actuation mechanism, the system further comprising:

a pivot member for movably coupling the aperture door to the housing shell, the pivot member being fixably coupled with the aperture door and rotatably coupled with the housing shell;

a cable coupled to the pivot member and being at least partially wrapped around the circumference of the pivot member, such that drawing the cable from the circumference of the pivot member causes the pivot member to rotate and move the aperture door from the closed position to the open position; and a tab coupled to the end of the cable remote from the pivot member, the tab for engaging the aperture door actuation mechanism upon receipt of the housing shell in the tray;

wherein upon receiving the housing shell containing the tape media and leader block in the tray, the aperture door actuation mechanism engages with the tab and urges the tab in a direction to draw the cable from the circumference of the pivot member and rotate the pivot member to move the aperture door from the closed position to the open position.

21. A method for using a mass data storage cartridge with a mass data storage read/write device, the mass data storage cartridge having a mass data storage media coupled with a leader block, the mass data storage cartridge having an aperture and an aperture door, the aperture door having a closed position covering the aperture and an open position exposing the aperture, the mass data storage cartridge having an aperture door opening mechanism, a loading mechanism having an aperture door actuation mechanism, the method comprising:

placing the mass data storage cartridge in the mass data storage read/write device loading mechanism;

engaging the aperture door opening mechanism with the aperture door actuation mechanism;

translating the loading mechanism toward the mass data storage read/write device, wherein the engagement of the aperture door opening mechanism with the aperture door actuation mechanism, and the translation of the loading mechanism toward the mass data storage read/write device actuates the aperture door opening mechanism so as to move the aperture door from the closed position substantially to the open position prior to registration of the cartridge in the mass data storage read/write device.

22. A mass data storage system for use with a mass data storage read/write device, the mass data storage read/write device having a leader block handling mechanism and a recording tape cartridge receptacle, the system comprising:

recording tape media wound around a reel, said tape media for storing data;

a leader block coupled to one end of the tape media, the leader block being configured to be gripped by the leader block handling mechanism upon receipt of the tape media and the leader block in the cartridge receptacle of the mass data storage read/write device;

a cartridge housing shell having an interior containing the tape media and leader block and being configured to be received, with the tape media and leader block contained therein, in the cartridge receptacle of the mass date storage read/write device, said housing shell further having an aperture of sufficient size for permitting the leader block handling mechanism to grip the leader block within the housing shell, upon receipt of the cartridge housing with the tape media and the leader block in the cartridge receptacle, the aperture also for permitting passage of the tape media and the leader block through the housing shell;

an aperture door for selectively covering the aperture, the aperture door being movably coupled to the housing shell, the aperture door having a closed position covering the aperture and an open position exposing the aperture, wherein the aperture door is detached from the leader block; and door operating means for selectively moving the aperture door between the closed position and the open position.

\* \* \* \* \*

UNITED STATES PATENT AND TRADEMARK OFFICE
CERTIFICATE OF CORRECTION

PATENT NO. : 5,868,333

DATED : FEBRUARY 9, 1999

INVENTOR(S) : NAYAK

It is certified that error appears in the above-identified patent and that said Letters Patent is hereby corrected as shown below:

Col. 11, line 21, claim 13: "complimentary" should read —complementary—

Col. 11, line 26, claim 14: "complimentary" should read —complementary—

Col. 11, line 62, claim 20: "date" should read —data—

Col. 13, line 5, claim 22: "date" should read —data—

Signed and Sealed this

Thirteenth Day of March, 2001

*Attest:*

NICHOLAS P. GODICI

*Attesting Officer*    *Acting Director of the United States Patent and Trademark Office*